(12) United States Patent
Grebenev (10) Patent No.: US 7,900,092 B2
(45) Date of Patent: Mar. 1, 2011

(54) KERNEL-LEVEL METHOD OF FLAGGING PROBLEMS IN APPLICATIONS

(75) Inventor: Dmitry Grebenev, E. Setauket, NY (US)

(73) Assignee: Computer Associates Think, Inc., Islandia, NY (US)

( * ) Notice: Subject to any disclaimer, the term of this patent is extended or adjusted under 35 U.S.C. 154(b) by 671 days.

(21) Appl. No.: 10/784,498

(22) Filed: Feb. 23, 2004

(65) Prior Publication Data

US 2005/0022063 A1  Jan. 27, 2005

Related U.S. Application Data

(60) Provisional application No. 60/486,638, filed on Jul. 11, 2003.

(51) Int. Cl.
*G06F 11/00* (2006.01)

(52) U.S. Cl. .......................... 714/38; 702/183

(58) Field of Classification Search .................. 714/38, 714/47

See application file for complete search history.

(56) References Cited

U.S. PATENT DOCUMENTS

| 5,222,193 | A | * | 6/1993 | Brooks et al. ................ 706/25 |
| 5,463,775 | A | * | 10/1995 | DeWitt et al. ............... 702/186 |
| 5,485,626 | A | * | 1/1996 | Lawlor et al. ............... 719/315 |
| 5,572,672 | A | * | 11/1996 | Dewitt et al. .................. 714/47 |
| 5,664,095 | A | * | 9/1997 | Cox et al. ..................... 714/47 |
| 5,684,945 | A | * | 11/1997 | Chen et al. .................. 719/313 |
| 5,835,765 | A | * | 11/1998 | Matsumoto .................. 718/102 |
| 5,950,204 | A | * | 9/1999 | Shealy ........................ 707/204 |
| 5,950,221 | A | * | 9/1999 | Draves et al. ............... 711/100 |
| 5,953,530 | A | * | 9/1999 | Rishi et al. .................. 717/127 |
| 6,098,181 | A | * | 8/2000 | Hamilton et al. .............. 714/25 |
| 6,148,335 | A | * | 11/2000 | Haggard et al. ............. 709/224 |
| 6,330,689 | B1 | * | 12/2001 | Jin et al. ....................... 714/15 |
| 6,377,907 | B1 | * | 4/2002 | Waclawski .................. 702/182 |
| 6,477,665 | B1 | * | 11/2002 | Bowman-Amuah .......... 714/39 |
| 6,523,141 | B1 | * | 2/2003 | Cantrill ........................ 714/48 |
| 6,629,266 | B1 | | 9/2003 | Harper et al. |
| 6,671,810 | B1 | * | 12/2003 | Jardin ............................ 726/3 |
| 6,691,067 | B1 | * | 2/2004 | Ding et al. .................. 702/186 |
| 6,799,208 | B1 | * | 9/2004 | Sankaranarayan et al. .. 709/223 |
| 6,804,630 | B2 | * | 10/2004 | Lee et al. .................... 702/186 |

(Continued)

FOREIGN PATENT DOCUMENTS

WO  WO 02/097630 A2  12/2002

OTHER PUBLICATIONS

European Patent Office Communication Search Report in Application No. 04756680.7-2224/1652086 PCT/US2004021589, dated Jan. 18, 2010, 3 pages.

(Continued)

*Primary Examiner* — Robert Beausoliel
*Assistant Examiner* — Elmira Mehrmanesh
(74) *Attorney, Agent, or Firm* — Baker Botts L.L.P.

(57) ABSTRACT

A method of identifying problems in applications is provided. The method in one embodiment comprises monitoring at a kernel level system resource usage of one or more running applications without modifying run-time environments of the running applications and identifying from the monitored system usage, an application whose system usage pattern meets a predetermined criteria associated with one or more problems.

27 Claims, 3 Drawing Sheets

U.S. PATENT DOCUMENTS

| | | | |
|---|---|---|---|
| 6,826,575 B1* | 11/2004 | Waclawski | 707/102 |
| 6,892,236 B1* | 5/2005 | Conrad et al. | 709/224 |
| 6,938,254 B1* | 8/2005 | Mathur et al. | 718/104 |
| 6,957,208 B1* | 10/2005 | Boucher et al. | 706/55 |
| 6,976,193 B2* | 12/2005 | Dubal | 714/47 |
| 7,076,695 B2* | 7/2006 | McGee et al. | 714/47 |
| 2002/0161818 A1 | 10/2002 | Watakabe et al. | |
| 2002/0161932 A1* | 10/2002 | Herger et al. | 709/321 |
| 2003/0061324 A1 | 3/2003 | Atherton et al. | |
| 2003/0110007 A1* | 6/2003 | McGee et al. | 702/179 |
| 2004/0261081 A1* | 12/2004 | Sen | 719/313 |

OTHER PUBLICATIONS

European Patent Office Communication Search Report in Application No. 04756680.7-2224, dated Jul. 22, 2010, 5 pages.

* cited by examiner

KERNEL-LEVEL METHOD OF FLAGGING PROBLEMS IN APPLICATIONS

CROSS-REFERENCE TO RELATED APPLICATIONS

This application claims the benefit of U.S. Provisional Patent Application No. 60/486,638 entitled KERNEL-LEVEL METHOD OF FLAGGING PROBLEMS IN APPLICATIONS filed on Jul. 11, 2003.

TECHNICAL FIELD

This application relates to flagging applications that may have memory leak and other resource usage problems using data collected at the kernel level.

BACKGROUND

Many currently available debugging tools require that programs be compiled and run in a different environment than their normal runtime environment, for example, with instrumented libraries and modules specifically used for debugging purposes. In addition, most debugging tools require many manual steps and time-consuming manual analysis in order to determine problems in an application. A hands-off tool that identifies potential problems with no intrusion to the applications while they are running in their natural run-time environment is desirable.

SUMMARY

A method of identifying potential problems in applications is provided. The method in one embodiment comprises monitoring at a kernel level system resource usage of one or more running applications without modifying run-time environments of the running applications and identifying from the monitored system usage, an application whose system usage pattern satisfies a predetermined criteria associated with one or more problems. The system resource usage may include, but is not limited to memory usage.

A system for identifying problems in applications in one embodiment comprises a data collection module and a data analysis module. The data collection module in one aspect is operable to retrieve information about a running application at a kernel level. The data analysis module in one aspect is operable to determine from the retrieved information one or more system usage patterns that may be associated with one or more problems.

Further features as well as the structure and operation of various embodiments are described in detail below with reference to the accompanying drawings. In the drawings, like reference numbers indicate identical or functionally similar elements.

DETAILED DESCRIPTION

Figure 1:
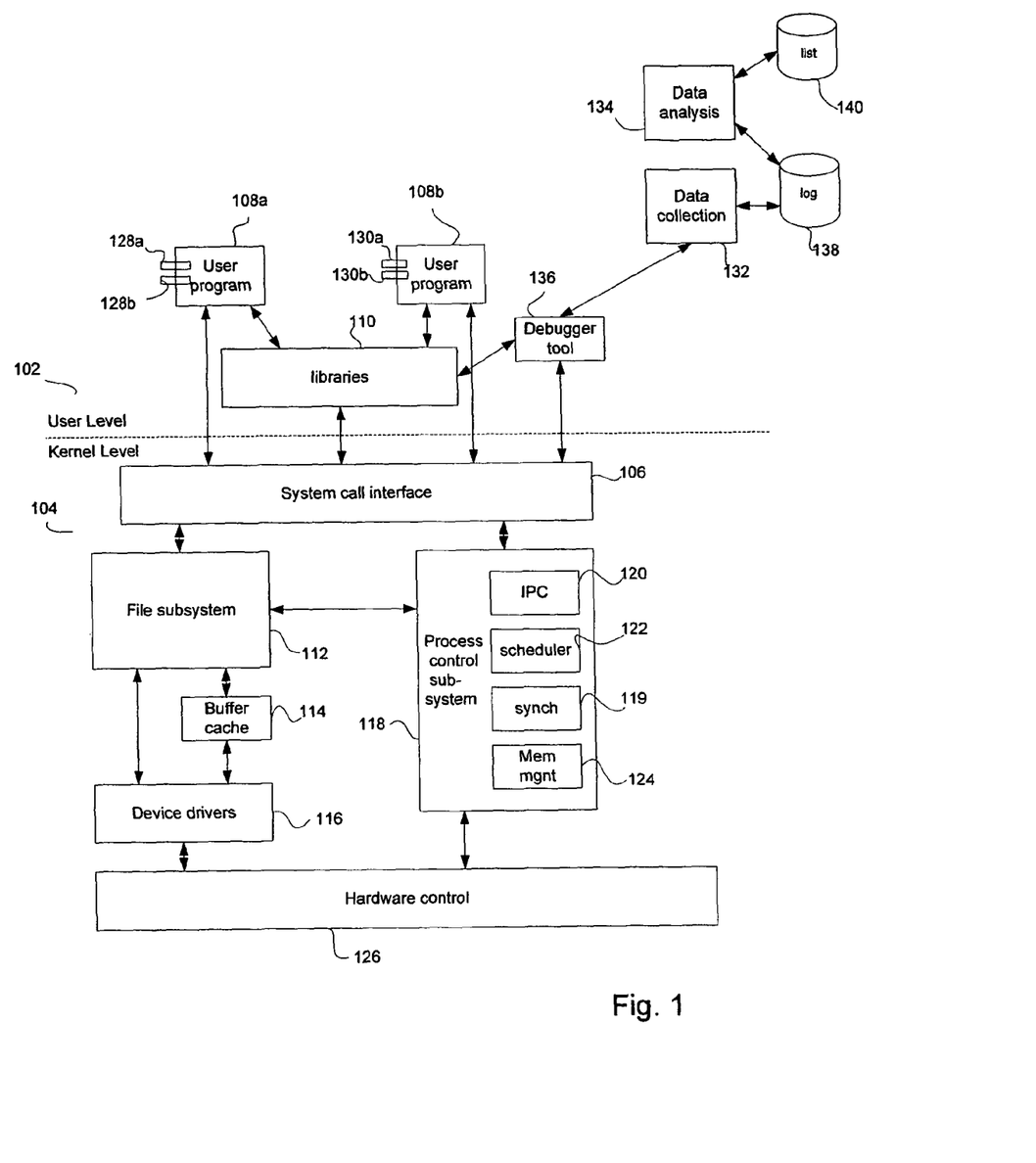
FIG. 1 is a block diagram illustrating a system kernel and various modules including the problem identifying module of the present disclosure in one embodiment.

FIG. 1 is a block diagram illustrating a system kernel and various modules including the problem identifying module of the present disclosure in one embodiment. The block diagram shown in FIG. 1 is presented for illustrative purposes only. Other Unix systems may have kernel models that deviate from the one shown in FIG. 1. Further, the problem identifying module of the present disclosure is not limited to applications in Unix Systems only, but rather, may be applied to other systems such as Windows, NT, Linux. FIG. 1 shows two levels: user 102 and kernel 104. The system call interface 106 represents the border between user programs 108a, 108b and the kernel. Libraries 110 map system calls invoked by the user programs 108a, 108b to the primitives needed to enter the kernel level 104. Assembly language programs may invoke system calls directly without a system call library. The libraries 110 are linked with the user programs 108a, 108b at compile time and thus may be considered as part of the user programs 108a, 108b.

The kernel level shown in FIG. 1 is partitioned into two subsystems: file subsystem 112 and process control subsystem 118. The file subsystem 112 accesses file data, for example, using buffering mechanism 114 that regulates data flow between the operating system and secondary storage devices via device drivers 116. The process control subsystem 118 is responsible for process synchronization 119, interprocess communication 120, memory management 122, and process scheduling 124. The file subsystem 112 and the process control subsystem 118 interact, for example, when loading a file into memory for execution. The process control subsystem 118 reads executable files into memory before executing them. The memory management module 124 controls the allocation of memory. The scheduler module 122 allocates the CPU (central processing unit) to processes. The system interprocess communications 120 include asynchronous signaling of events and synchronous transmission of messages between processes. The hardware control 126 is responsible for handling interrupts and for communicating with the machine.

A process is the execution of a program and comprises a pattern of bytes that the CPU interprets as machine instructions (text), data, and stack. Several processes 128a, 128b or 130a, 130b may be instances of a user program 108a or 108b. The kernel loads an executable file into memory during, for example, an exec system call, and the loaded process comprises of at least three parts called regions: text, data, and the stack. A running process, thus, in one embodiment uses separate memory areas, allocating and deallocating the memory areas as the process runs. That is, once a process performs its desired functions, allocated memory is freed for other use. Similarly, a user program 108a or 108b may spawn one or more children processes and those children processes may in turn spawn additional processes to perform various tasks. Once the tasks are performed, however, under normal conditions, those processes should exit, either gracefully or with error conditions.

The data collection module 132 in one embodiment collects data related to the user programs 108a, 108b while allowing the user programs 108a, 108b to run in their natural run-time environment or mode, for example, without having to be recompiled or relinked to be run in a debug mode. The data collected by the data collection module 132, for example, may include, but are not limited to, information about the memory such as the text, data, and stack memory used by the user programs 108a, 108b, the number of running or created processes per user programs 108a, 108b, the CPU usage per user programs 108*a*, 108*b*, and any other kernel or system resource usage data related to the user programs 108*a*, 108*b*.

The data collection module 132 in one embodiment utilizes exiting debugging tools to obtain the selected data. For example, the Q4 debugger released with Hewlett Packard's operating system, Linux kernel debuggers KDB or GDB, or the modular debugger (MDB) for Solaris may be utilized to retrieve information about the kernel space data and the various state of the system while the user programs 108*a*, 108*b* are running. An example of a Q4 script for retrieving such information may include calling Q4 as q4-p/stand/vmunix/dev/mem, then invoking a script (such as a Perl script) that drives per-process data collection and saves selected fields of the output in a human readable format.

Similarly, other debugging tools may be used to generate a script for programmatically retrieving various system information at a kernel level. The retrieved information may be stored, for example, as a log file 138.

The data analysis module 134 may identify user programs that may have problems such as memory leaks, orphan processes by analyzing the information stored in the log file 138. The analysis may involve filtering the information and selecting those that meet predetermined criteria as described in more detail with reference to FIG. 3.

Figure 2:
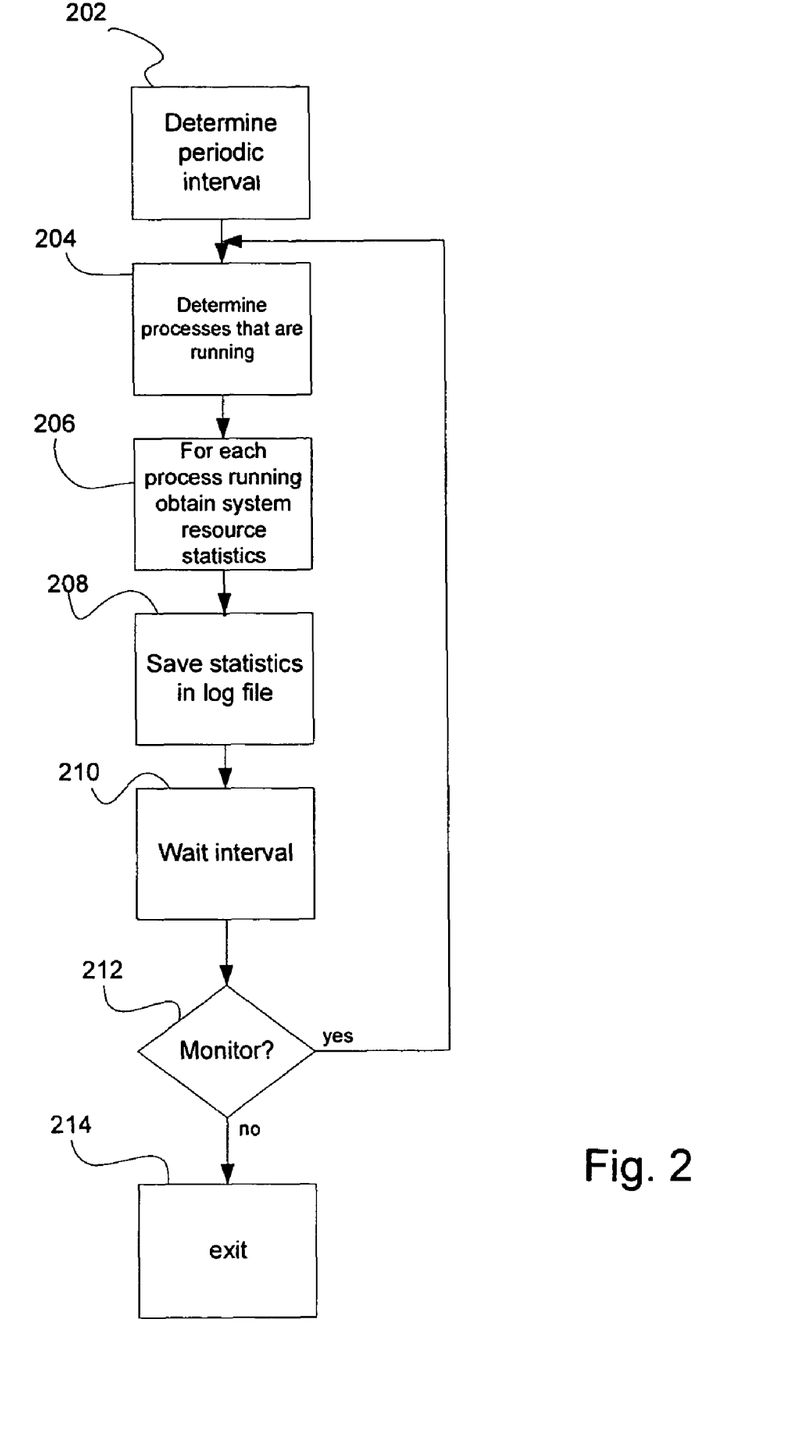
FIG. 2 illustrates a flow diagram for monitoring kernel level system resource usage and collecting the related information.

FIG. 2 illustrates a flow diagram for monitoring kernel level system resource usage and collecting the related information. The monitoring and collecting, for example, may be performed periodically by executing existing kernel debugger facilities and extracting selected fields of data from the kernel debugger output. At 202, an interval period for monitoring is obtained, for instance, from a command line, from a file, or as an input to a query, or any other method for receiving input information. The interval, for example, may be every 600 seconds or the like. In another embodiment, the interval period may be obtained using starting and end time for monitoring. For example, a user may specify begin and end time and a number of times to monitor during that period.

At 204, processes that are running in a system are determined, for example, by calling subroutine LoadAllProcs. At 206, system resource statistics is obtained for each process running. The system resource statistics may be obtained by using existing facilities such as the Q4, MDB, or any other appropriate kernel debugging utilities, e.g., gdb/boot/vm-linux/dev/mem. For example, using the Q4 utility, memory page count allocated and used by a running process may be obtained and logged. The memory page count may be further typed into different types of memory being used by the running process: for example, text, data, and stack types. At 208, this information may be saved in a log file. The log file, for instance, may contain lines such as:

| (PID) | (TEXT) | (DATA) | (STACK) |
|-------|--------|--------|---------|
| 0x001 | 3 | 5 | 2 |
| 0x002 | 5 | 3 | 6 |
| . | . | . | . |
| . | . | . | . |
| . | . | . | . |
| 0x003 | 4 | 9 | 9 |
| 0x001 | 2 | 7 | 2 |
| 0x003 | 5 | 11 | 7 |

Similarly, a number of processes associated with a user program may be obtained to determine if any of the processes are defunct or orphaned by using respectively the process status or parent pid field as a selection criterion.

At 210, the method waits for the amount of time equivalent to the interval period, for example, by a sleep call for that amount of time. At 212, it is determined as to whether more monitoring is to be performed. If the monitoring is to continue, the method returns to 204. Otherwise, the method stops, performing any cleanups such as releasing memory, closing files, and exiting any children processes gracefully.

Figure 3:
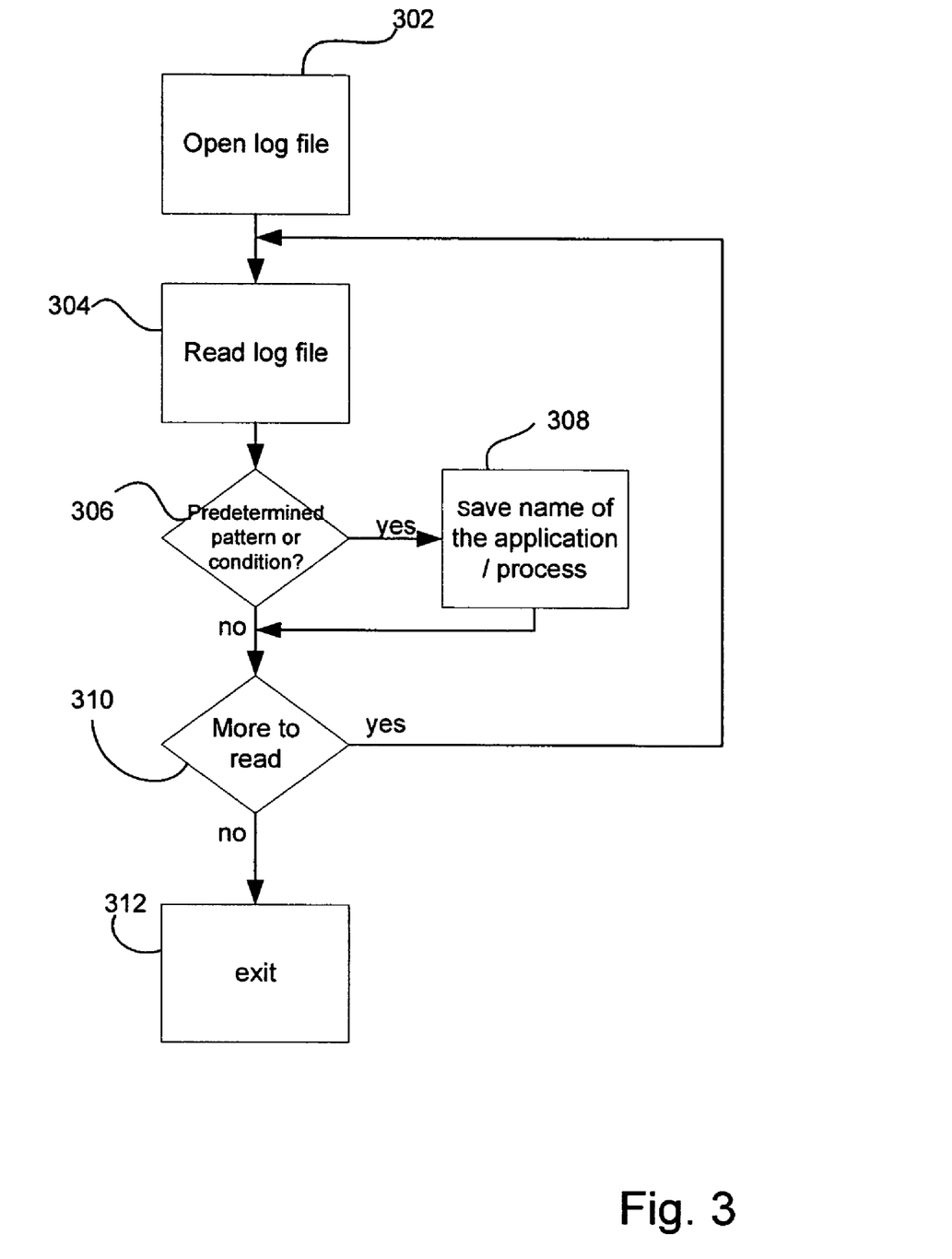
FIG. 3 illustrates a flow diagram for analyzing the kernel level information.

FIG. 3 illustrates a flow diagram for analyzing the kernel level information. At 302, the file that contains the system resource usage information is opened. At 304, the information is read. A line of a file, for example, may contain a process identifier and the memory usage for that process as shown above. In another example, a line of a file may contain an application identifier and the number of processes that are spawned by the process. In yet another example, a line of a file may contain a process identifier and the CPU usage for that process. At 306, the information is used to determine whether an abnormal pattern or condition exists. An abnormal pattern may exist, for example, if one particular process's memory size increases continuously from period to period; if one particular long-running process's memory size continually increases without any decrease in size during that number of interval periods; if a process is running even when a parent process is not (orphan process); if a process is continuously spawning new processes.

A continuous increase in memory size for a particular process, for example, may be detected if the memory size logged in the log file (138 FIG. 1) for that process has increased from one period to another period of monitoring. A comparison of a memory size from the previous period to the current period, for example, may determine whether there is an increase from one period to another period. A number of increases then may be stored in a buffer and compared with a predetermined number to determine if the increase is excessive. Picking the right query interval and duration of testing depends on the application and should be chosen appropriately (e.g., every 60 seconds).

An existence of orphan process is detected, for example, if no parent process for a particular process is found in the log file as one of the running processes. In another example, a process is detected as spawning unusually large number of children processes if a predetermined number of processes all have the same parent process identifiers. At 308, the application or the process identifier detected as meeting the abnormal pattern or condition is then saved, for example, in another file (140 FIG. 1). At 310, if there are more lines to read in the log file, the method continues to 304. Otherwise, at 312, the method stops.

The system and method of the present disclosure may be implemented and run on a general-purpose computer. The system and method of the present disclosure, for example, may be utilized during development of application programs or when run at a customer's site, for example, to detect and identify possible problems associated with the application programs. The embodiments described above are illustrative examples and it should not be construed that the present invention is limited to these particular embodiments. Although the description was provided using the Unix system as an example, it should be understood that the method and system disclosed in the present application may apply to any other computer operating systems. Thus, various changes and modifications may be effected by one skilled in the art without departing from the spirit or scope of the invention as defined in the appended claims.

I claim:

1. A method of identifying problems in applications comprising:
   monitoring at a kernel level system resource usage of one or more running applications without modifying run-time environments of the one or more applications;
   from the system resource usage, determining a memory usage pattern for each of a plurality of applications, each memory usage pattern indicating for a selected one of the running applications:
      a first memory usage amount during a first time period;
      a second memory usage amount during a second time period; and
      a change in the memory usage of the selected one of the plurality of applications from the first time period to a second time period, the change in the memory usage equaling the difference between the first memory usage amount and the second memory usage amount;
   determining whether the change in the memory usage of the selected one of the plurality of applications satisfies a predetermined criteria associated with one or more problems; and
   if the change in the memory usage of the selected one of the plurality of applications satisfies the predetermined criteria, identifying the selected one of the plurality of applications to a user, and
   wherein the one or more applications comprise one or more user applications initiated at the user level; and
   wherein monitoring at a kernel level system resource usage of one or more running applications comprises monitoring at a kernel level system resource usage of one or more running processes belonging to one or more user applications wherein the one or more running processes comprise one or more processes initiated at the kernel level by the one or more user applications, the system resource usage comprising kernel space memory used by each of the plurality of user applications.

2. The method of claim 1, wherein the system resource usage comprises a number of processes that each of the one or more applications have spawned and the predetermined criteria comprises exceeding a predetermined limit on the number of processes that each of the one or more applications may spawn.

3. The method of claim 1, wherein:
   monitoring at a kernel level system resource usage of one or more running applications comprises monitoring a parent-child relationship between one or more running processes and each of the one or more applications; and
   determining whether the system usage pattern of the first application satisfies a predetermined criteria associated with one or more problems comprises determining whether the first application has orphaned one of the one or more running processes, wherein an orphaned process is one wherein a child process is running even though a corresponding parent process associated with the child process is not running.

4. The method of claim 1, wherein the system resource usage comprises memory usage of the one or more running applications.

5. The method of claim 1, wherein the system resource usage of the one or more running applications is monitored over a plurality of consecutive discrete time periods.

6. The method of claim 5, wherein:
   the system resource usage comprises an amount of memory usage for each of the one or more applications; and
   the predetermined criteria is a limit on a number of memory usage increases allowed during the plurality of time periods.

7. The method of claim 5, wherein:
   the system resource usage comprises an amount of memory usage for each of the one or more applications; and
   the predetermined criteria is a generally continuous increase in the amount of memory usage during the plurality of time periods.

8. The method of claim 5, wherein:
   the system resource usage comprises a number of processes that each of the plurality of applications have spawned; and
   the predetermined criteria is a generally continuous increase in the number of child processes spawned during the plurality of time periods.

9. The method of claim 1, wherein identifying the selected one of the plurality of applications to a user comprises saving an identifier of the selected one of the plurality of applications in a reference file, and further comprising saving identifiers of any other of the plurality of applications whose system usage pattern satisfies a predetermined criteria associated with one or more problems in the reference file.

10. The method of claim 9, wherein a computer automatically:
    monitors the kernel level system resource usage of one or more running applications;
    determines whether a memory usage pattern of the selected one of the plurality of applications satisfies a predetermined criteria associated with one or more problems; and
    identifies the selected one of the plurality of applications.

11. The method of claim 1, wherein determining whether a memory usage pattern of the first application satisfies a predetermined criteria associated with one or more problems comprises:
    comparing the memory usage for the first application against the predetermined criteria; and
    selecting the first application from the one or more running applications if the memory usage pattern of the first application satisfies the predetermined criteria.

12. The method of claim 1, wherein each memory usage pattern for each of the plurality of applications comprises:
    the amount of memory in a first region being used by a process to store text;
    the amount of memory in a second region being used by the process to store data; and
    the amount of memory in a third region being used by the process to store stack memory.

13. The method of claim 1, wherein:
    monitoring system resource usage comprises monitoring memory usage by each of the plurality of applications over a plurality of consecutive discrete time periods;
    determining whether a change in the memory usage of the first application comprises determining that an amount of memory usage for the first application has increased during a plurality of consecutive discrete time periods; and
    diagnosing a memory leak associated with the first application in response to determining that the amount of memory usage for the first application has increased during the plurality of consecutive discrete time periods.

14. A method of identifying memory problems in applications, comprising:
    monitoring at a kernel level memory usage of a plurality of running applications without modifying run-time environment of the applications, the memory usage indicating for each of the plurality of running applications:
a first memory usage amount during a first time period;
a second memory usage amount during a second time period; and
producing an output comprising at least the memory usage; and
determining a change in the memory usage of the plurality of running applications, the change in the memory usage indicating a change in the memory usage of the at least one running application from a first time period to a second time period, the change in the memory usage equaling the difference between the first memory usage amount and the second memory usage amount;
determining whether the change in the memory usage of the at least one running application satisfies a predetermined criteria associated with one or more problems; and
if the change in the memory usage of the at least one running application satisfies the predetermined criteria, identifying the at least one running application to a user,
wherein the plurality of running applications comprise a plurality of user applications initiated at the user level, and
wherein monitoring, at the kernel level, memory usage of the plurality of running applications comprises monitoring, at the kernel level, memory usage of one or more running processes belonging to the plurality of user applications, the one or more running processes being initiated at the kernel level by the plurality of user applications, the memory usage comprising kernel space memory used by each of the plurality of user applications.

15. The method of claim 14, wherein:
the memory usage of the plurality of running processes is monitored over a plurality of consecutive discrete time periods, and
the predetermined criteria is a limit on a number of memory increases allowed during the plurality of time periods.

16. The method of claim 14, wherein the memory usage of the one or more running applications comprises:
the amount of memory in a first region being used by a process to store text;
the amount of memory in a second region being used by the process to store data; and
the amount of memory in a third region being used by the process to store stack memory.

17. The method of claim 14, wherein:
monitoring memory usage comprises monitoring memory usage by each of the plurality of running applications over a plurality of consecutive discrete time periods;
determining whether a change in the memory usage of the first application comprises determining that an amount of memory usage for the first application has increased during a plurality of consecutive discrete time periods; and
diagnosing a memory leak associated with the first application in response to determining that the amount of memory usage for the first application has increased during the plurality of consecutive discrete time periods.

18. A system for identifying memory problems in applications, comprising a computer operable to:
monitor at a kernel level memory usage of one or more running applications without modifying run-time environments of the one or more applications;
produce an output comprising at least the memory usage of one or more applications;
determining a memory usage pattern of a first application, the memory usage pattern indicating a change in the memory usage of the first application from a first time period to a second time period;
determine whether the change in the memory usage of the first application satisfies a predetermined criteria associated with one or more problems; and
if the change in the memory usage of the first application satisfies the predetermined criteria, identify the first application by saving an identifier of the first application in a reference file, and
wherein the one or more running applications comprise one or more user applications initiated at the user level, and
wherein monitoring, at the kernel level, memory usage of the one or more running applications comprises monitoring, at the kernel level, memory usage of one or more running processes belonging to the one or more user applications, the one or more running processes initiated at the kernel level by the one or more user applications, the memory usage comprising kernel space memory used by each of the one or more user applications.

19. The system of claim 18, wherein the memory usage of the one or more running applications comprises:
the amount of memory in a first region being used by a process to store text;
the amount of memory in a second region being used by the process to store data; and
the amount of memory in a third region being used by the process to store stack memory.

20. The system of claim 18, wherein:
monitoring memory usage comprises monitoring memory usage by each of the plurality of running applications over a plurality of consecutive discrete time periods;
determining whether a change in the memory usage of the first application comprises determining that an amount of memory usage for the first application has increased during a plurality of consecutive discrete time periods; and
diagnosing a memory leak associated with the first application in response to determining that the amount of memory usage for the first application has increased during the plurality of consecutive discrete time periods.

21. A method of identifying memory problems in applications, comprising:
monitoring at a kernel level memory usage of a plurality of running applications without modifying run-time environments of the running applications, the memory usage indicating for each of the plurality of running applications:
a first memory usage amount during a first time period; and
a second memory usage amount during a second time period;
determining a memory usage pattern of a first application, a change in the memory usage indicating a change in the memory usage of the first application from a first time period to a second time period, the change in the memory usage equaling the difference between the first memory usage amount and the second memory usage amount;
determining whether the change in the memory usage of the first application satisfies a predetermined criteria associated with one or more problems; and
if the change in the memory usage of the first application satisfies the predetermined criteria, identifying the first application without identifying the one or more applications whose memory usage patterns do not satisfy the predetermined criteria associated with the one or more memory problems, and wherein the plurality of running applications comprise a plurality of user applications initiated at the user level, and wherein monitoring, at the kernel level, memory usage of the plurality of running applications comprises monitoring, at the kernel level, memory usage of a plurality of running processes belonging to the plurality of user applications, each of the plurality of running processes initiated at the kernel level by a one of the plurality of user applications, the memory usage comprising kernel space memory used by each of the plurality of user applications.

22. The method of claim 21, wherein the monitored memory usage comprises at least a stack memory, data memory, and text memory.

23. A method of identifying memory problems in applications, comprising:

collecting system resource usage at a kernel level of one or more running processes belonging to one or more running applications without modifying run-time environments of the one or more running applications;

from the system resource usage, determining a memory usage pattern of each of a plurality of applications, each memory usage pattern indicating for a selected one of the plurality of applications:

a first memory usage amount during a first time period;

a second memory usage amount during a second time period; and a change in the memory usage of the selected one of the plurality of applications from the first time period to the second time period, the change in the memory usage equaling the difference between the first memory usage amount and the second memory usage amount;

determining whether the change in the memory usage of selected one of the plurality of applications satisfies a predetermined criteria associated with one or more problems; and if the change in the memory usage of the selected one of the plurality of applications satisfies the predetermined criteria, identifying the selected one of the plurality of applications to a user, and wherein the one or more running applications comprise one or more user applications initiated at the user level; and wherein the one or more running processes comprise one or more processes initiated at the kernel level by the one or more user applications, the system resource usage comprising kernel space memory used by each of the one or more user applications.

24. A system for identifying problems in applications, comprising:

a data collection module operable to retrieve information about a plurality of running user-applications at a kernel level, the information comprising:

a first memory usage amount during a first time period;

a second memory usage amount during a second time period; and a change in the memory usage of the selected one of the plurality of running user applications from the first time period to the second time period, the change in the memory usage equaling the difference between the first memory usage amount and the second memory usage amount; and a data analysis module operable to:

determine abnormal system usage pattern in the information based on the difference between the first memory usage amount and the second memory usage amount; and identify a first user application associated with the abnormal usage pattern that satisfies a predetermined criteria associated with one or more problems, and wherein the plurality of running user applications are initiated at the user level, wherein the first memory usage comprises kernel space memory used by the selected one of the plurality of running user applications during the first time period and wherein the second memory usage comprises kernel space memory used by the selected one of the plurality of running user applications during the second time period.

25. A program storage device readable by a machine, tangibly embodying a program of instructions executable by the machine to perform method steps of identifying problems in applications, comprising:

monitoring, at a kernel level, system resource usage of one or more running applications without modifying run-time environments of the one or more applications;

from the system resource usage, determining a memory usage pattern for each of a plurality of applications, each memory usage pattern indicating for a selected one of the plurality of applications:

a first memory usage amount during a first time period;

a second memory usage amount during a second time period; and a change in the memory usage of the selected one of the plurality of applications from the first time period to a second time period, the change in the memory usage equaling the difference between the first memory usage amount and the second memory usage amount;

determining whether the change in the memory usage of the selected one of the plurality of applications satisfies a predetermined criteria associated with one or more problems; and if the change in the memory usage of the selected one of the plurality of applications satisfies the predetermined criteria, identifying the selected one of the plurality of applications to a user, and wherein the system resource usage comprises a parent-child relationship between one or more processes and each of the one or more applications; and determining whether a system usage pattern of the selected one of the plurality of applications satisfies a predetermined criteria associated with one or more problems comprises determining whether the selected one of the plurality of applications has orphaned one of the one or more running processes, wherein an orphaned process is one wherein a child process is running even though a corresponding parent process associated with the child process is not running.

26. The program storage device of claim 25, wherein the memory usage of the one or more running applications comprises:

the amount of memory in a first region being used by a process to store text;

the amount of memory in a second region being used by the process to store data; and the amount of memory in a third region being used by the process to store stack memory.

27. The program storage device of claim 25, wherein:
monitoring memory usage comprises monitoring memory usage by each of the plurality of running applications over a plurality of consecutive discrete time periods;
determining whether a change in the memory usage of the first application comprises determining that an amount of memory usage for the first application has increased during a plurality of consecutive discrete time periods; and
diagnosing a memory leak associated with the first application in response to determining that the amount of memory usage for the first application has increased during the plurality of consecutive discrete time periods.

* * * * *